(12) United States Patent
Sugiyama et al.

(10) Patent No.: US 10,216,079 B2
(45) Date of Patent: Feb. 26, 2019

(54) SCANNING PROJECTOR SCREEN, AND SCANNING PROJECTOR SYSTEM

(71) Applicant: Yazaki Corporation, Tokyo (JP)

(72) Inventors: Tetsuya Sugiyama, Shizuoka (JP); Go Nakamura, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/261,121

(22) Filed: Sep. 9, 2016

(65) Prior Publication Data

US 2017/0090275 A1 Mar. 30, 2017

(30) Foreign Application Priority Data

Sep. 25, 2015 (JP) ................................. 2015-188503

(51) Int. Cl.
| | |
|---|---|
| *G02B 26/08* | (2006.01) |
| *G03B 21/60* | (2014.01) |
| *G02B 26/10* | (2006.01) |
| *G02B 27/01* | (2006.01) |
| *H04N 9/31* | (2006.01) |

(52) U.S. Cl.
CPC ......... *G03B 21/60* (2013.01); *G02B 26/0833* (2013.01); *G02B 26/105* (2013.01); *G02B 27/0101* (2013.01); *H04N 9/3129* (2013.01); *G02B 2027/013* (2013.01); *G02B 2027/0118* (2013.01)

(58) Field of Classification Search
CPC .............. G02B 26/0833; G02B 26/105; G02B 2027/013; G02B 27/0101; G03B 21/60; H04N 9/3129

USPC ........................................................ 359/214.1
See application file for complete search history.

(56) References Cited

U.S. PATENT DOCUMENTS

| | | | | |
|---|---|---|---|---|
| 2,252,263 | A | * 8/1941 | Kremer | .................... G03C 7/00 348/E5.073 |
| 3,740,469 | A | * 6/1973 | Herndon | .............. H04N 5/7425 348/206 |
| 7,111,943 | B2 | 9/2006 | Agostinelli et al. | |
| 7,334,902 | B2 | * 2/2008 | Streid | .................... G03B 21/32 353/98 |
| 8,766,879 | B2 | 7/2014 | Fujikawa et al. | |
| 2005/0024722 | A1 | 2/2005 | Agostinelli et al. | |
| 2005/0041211 | A1 | 2/2005 | Streid et al. | |
| 2015/0156447 | A1 | 6/2015 | Lee | |
| 2016/0344986 | A1 | 11/2016 | Hirakawa | |

FOREIGN PATENT DOCUMENTS

| | | |
|---|---|---|
| CN | 102902064 A | 1/2013 |
| CN | 104597696 A | 5/2015 |
| JP | 8-95537 A | 4/1996 |

(Continued)

OTHER PUBLICATIONS

Japanese Office Action for the related Japanese Patent Application No. 2015-188503 dated Oct. 17, 2017.

(Continued)

*Primary Examiner* — Euncha P Cherry
(74) *Attorney, Agent, or Firm* — Kenealy Vaidya LLP

(57) ABSTRACT

Provided is a scanning projector screen which can suppress inhomogeneity of a beam diameter. The scanning projector screen has a screen surface that is curved in at least one direction.

1 Claim, 4 Drawing Sheets

(56) References Cited

FOREIGN PATENT DOCUMENTS

| | | | |
|---|---|---|---|
| JP | 2007-514196 | A | 5/2007 |
| JP | 2007-264076 | A | 10/2007 |
| JP | 2008-51963 | A | 3/2008 |
| JP | 2009-98553 | A | 5/2009 |
| JP | 2011-100073 | A | 5/2011 |
| JP | 2012-208440 | A | 10/2012 |
| JP | 2015-022793 | A | 2/2015 |
| JP | 2016-218319 | A | 12/2016 |

OTHER PUBLICATIONS

Chinese Office Action for the related Chinese Patent Application No. 201610850393.4 dated Apr. 27, 2018.
Japanese Office Action for the related Japanese Patent Application No. 2015-188503 dated Apr. 3, 2018.
Chinese Office Action for the related Chinese Patent Application No. 201610850393.4 dated Oct. 22, 2018.

* cited by examiner

SCANNING PROJECTOR SCREEN, AND SCANNING PROJECTOR SYSTEM

BACKGROUND

Technical Field

The present invention relates to a scanning projector screen.

Related Art

A scanning projector combines laser beams of R, G and B colors subjected to brightness modulation into one beam, and makes them scan on a screen in synchronization with the brightness modulation to form a two-dimensional image on the screen. The scanning projector has a characteristic feature that it is easy to provide high resolution, downsizing and low power consumption compared to a method of projecting two-dimensional images.

As shown as an example in FIG. 4, a scanning projector 400 includes a red laser light source 410R, a green laser light source 410G and a blue laser light source 410B as light sources, and each light source (410R, 410G and 410B) is subjected to an intensity homogenization and collimation as needed and performs and emits laser light. The emitted light from each light source (410R, 410G and 410B) is subjected to brightness modulation in synchronization with the scanning in pixel units.

The respective emitted light pass through collective lenses (412R, 412G and 412B) arranged on optical axes near the light sources (410R, 410G and 410B), thereby providing convergent light. The convergent light of three R, G and B colors are combined into one convergent light within the scanning projector 400.

In the example shown in FIG. 4, the green convergent light is combined (i.e., multiplexed) with the red convergent light by a dichroic mirror 414G, and further the blue convergent light is combined (i.e., multiplexed) with them by a dichroic mirror 414B into one synthetic light. Focal distance and arrangement position of the respective collective lenses (412R, 412G and 412B) are determined such that the respective convergent lights of the respective colors are focused at the same position.

The synthetic light is bent by a mirror 420 for downsizing, and then an irradiation direction of the synthetic light is controlled by a high-speed two-dimensional scanning element 430 and scanned in two-dimension. The high-speed two-dimensional scanning element 430 is an element which performs optical scanning by using a movable mirror 430a. In general, the high-speed two-dimensional scanning element 430 includes a two-dimensional scanning MEMS mirror (MEMS optical scanner); however, vertical scanning and horizontal scanning MEMS mirrors may be combined. Alternatively, a galvanometer mirror may be used.

A rectangular screen 500 of a rectangular shape is arranged on a light-focusing surface of the synthetic light. The screen 500 may be a transmissive type or a reflective type. Synthetic light of each pixel is scanned at a high speed on the screen 500, and therefore two-dimensional image is perceived as a result of an afterimage effect of eyes.

Patent Literature 1: JP 2012-208440 A

SUMMARY

Focusing on the scanning in one side direction of the screen 500, more particularly in a longitudinal direction (i.e., a long-side direction), the movable mirror 430a of the high-speed two-dimensional scanning element 430 makes a reciprocating rotation movement at a predetermined angle around a predetermined rotation axis 430b.

Here, a distance between the screen 500 and the rotation axis 430b changes according to a position of the longitudinal direction of the screen 500. For example, as shown in FIG. 4, in case of an arrangement in which the synthetic light at a center portion of an image in a longitudinal direction is perpendicularly irradiated to a center of the screen 500 in the longitudinal direction, a distance to the center portion of the screen 500 in the longitudinal direction is the shortest, and the distance from the rotation axis 430b becomes longer with distance from the center.

Since the synthetic light is a convergent light, a beam diameter differs depending on the position of the longitudinal direction of the screen 500. For example, for the convergent light which is focused at the center portion of the screen 500 in the longitudinal direction, the beam diameter becomes larger with distance from the center. Although inhomogeneity of the beam diameter occurs in a short-side direction of the screen 500, the inhomogeneity is more remarkable in the longitudinal direction with longer scanning distance.

The scanning projector which uses laser light is focus-free and thus the inhomogeneity of the beam diameter does not influence focus adjustment. However, when the beam diameter is inhomogeneous, brightness may be uneven and/or a difference may be produced in a boundary state between neighboring pixels, causing reduction in clarity of the image. Therefore, it is preferable that the beam diameter is homogeneous in the screen scanning direction.

It is therefore an object of the present invention to provide a scanning projector screen which suppresses the inhomogeneity of the beam diameter.

In order to achieve the object mentioned above, a first aspect of the present invention provides a scanning projector screen having a screen surface that is curved in at least one direction. By arranging such scanning projector screen such that both ends of the curved screen surface are arranged closer to the rotation axis on a rotation axis of a movable mirror of a scanning projector which outputs a convergent light, distances between the rotation axis and respective points on the screen surface become equal. Consequently, inhomogeneity of a beam diameter can be suppressed. In order to achieve the object mentioned above, a second aspect of the present invention provides a scanning projector system including a scanning projector and a screen, wherein, the scanning projector includes a movable mirror which performs scanning of a convergent light by making a reciprocating rotation movement at a predetermined angle around a predetermined rotation axis, and the screen is curved such that both ends of the screen in a direction of the scanning are arranged closer to the rotation axis. Since the screen is curved such that the both ends of the screen in the scanning direction are arranged to come closer to the rotation axis of the movable mirror, the distances between the rotation axis and the respective points on the screen along the direction of the scanning are equal. Consequently, inhomogeneity of a beam diameter can be suppressed. In this case, the screen may be curved such that respective locations on the screen in the direction of the scanning are arranged at equal distance from the rotation axis. Consequently, the beam diameter can be equalized for the respective points on the screen surface in the direction of the scanning. In this case, the distance between the rotation axis and the respective locations in the direction of the scanning may be determined such that the convergent light is focused on the screen. Since the beam diameter is arranged minimum at the respective locations on the screen, a clear image can be obtained.

According to the present invention, there is provided a scanning projector screen which suppresses the inhomogeneity of the beam diameter.

DETAILED DESCRIPTION

Figure 1:
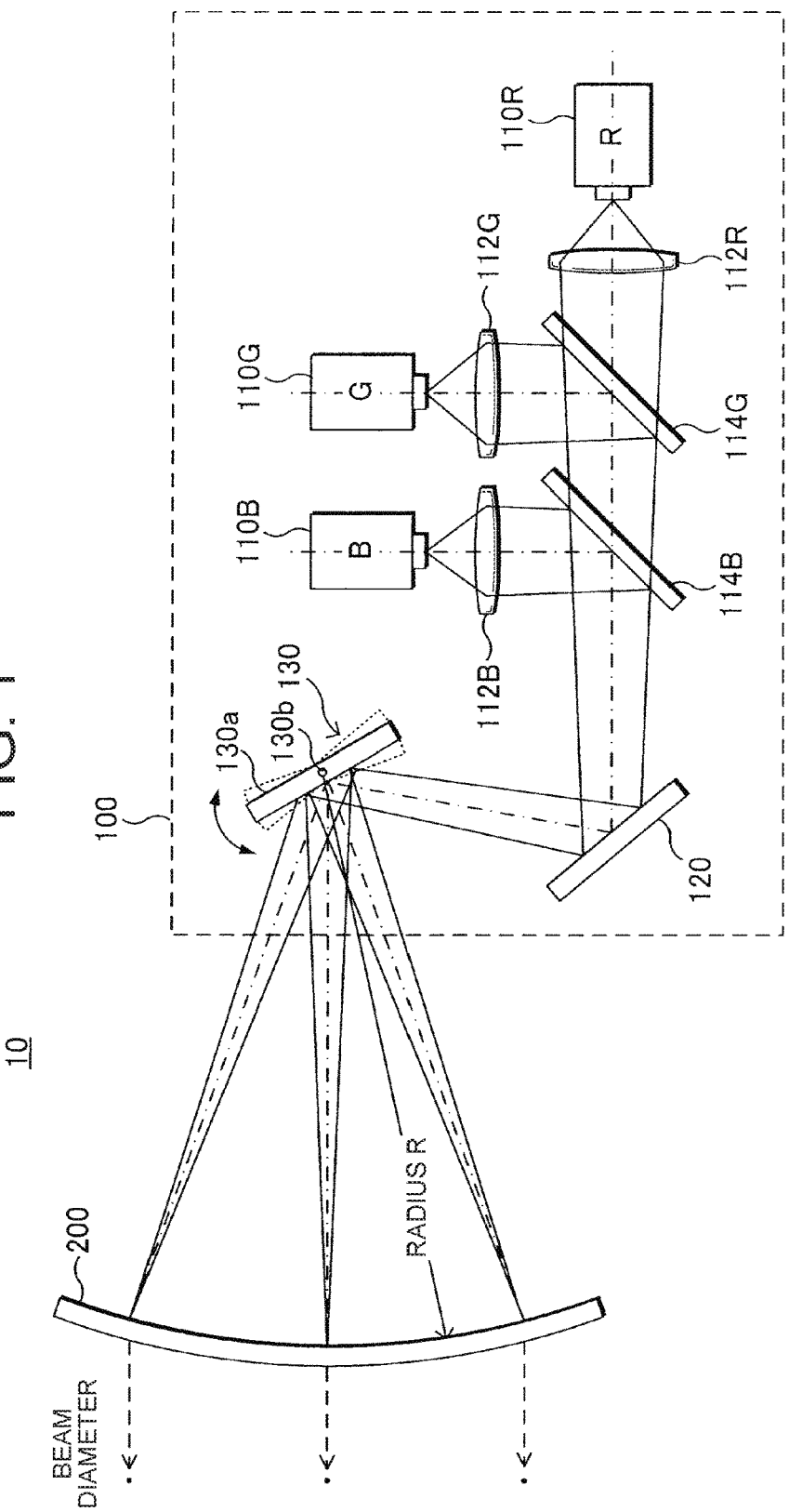
FIG. 1 is a schematic diagram showing a configuration of a scanning projector system according to the present embodiment.

An embodiment of the present invention will be described in detail with reference to the drawings. FIG. 1 is a schematic diagram showing a configuration of a scanning projector system 10 according to the present embodiment. As shown in FIG. 1, the scanning projector system 10 includes a scanning projector 100 and a screen 200. The scanning projector 100 may have the configuration similar to that of the conventional scanning projector 400 described above.

That is, the scanning projector 100 includes a red laser light source 110R, a green laser light source 110G and a blue laser light source 110B as light sources, and each light source (110R, 110G and 110B) is subjected to an intensity homogenization and collimation as needed and performs and emits laser light. The emitted light from each light source (110R, 110G and 110B) is subjected to brightness modulation in synchronization with the scanning in pixel units under control of an image processing device which is not shown.

The respective emitted lights pass through collective lenses (112R, 112G and 112B) arranged on optical axes near the light sources (110R, 110G and 110B), and thereby providing a convergent light. The convergent lights of three R, G and B colors are combined into one convergent light within the scanning projector 100.

In the example shown in FIG. 1, the green convergent light is combined (i.e., multiplexed) with the red convergent light by a dichroic mirror 114G, and further the blue convergent light is combined (i.e., multiplexed) with them by a dichroic mirror 114B into one synthetic light. The combining of the lights into one convergent light may be achieved using other techniques. In addition, focal distance and arrangement position of the respective collective lenses (112R, 112G and 112B) are determined such that the respective convergent lights of the respective colors are focused at the same position.

The synthetic light is bent by a mirror 120 for downsizing, and then an irradiation direction thereof is controlled by a high-speed two-dimensional scanning element 130 to scan the synthetic light in two-dimension. The high-speed two-dimensional scanning element 130 may include a two-dimensional scanning MEMS mirror; however, a vertical scanning MEMS mirror and a horizontal scanning MEMS mirror may be combined and used. Alternatively, a galvanometer mirror may be used as the high-speed two-dimensional scanning element 130.

The MEMS mirror is an optical scanning device produced using a MEMS (Micro Electro Mechanical System) technology, and a movable mirror 130a performs the optical scanning by making reciprocating rotation movement at a predetermined angle around a predetermined rotation axis 130b in a scanning direction. The rotation axis 130b may be defined by a mechanical shaft or may be defined virtually without providing a definite shaft. As the MEMS mirrors, various methods may be employed such as an electromagnetic type moving coil type, an electromagnetic type moving magnet type, an electrostatic type and a piezo type which have been proposed.

The screen 200 is arranged on a light-focusing surface of the synthetic light. The screen 200 may be a transmissive type or a reflective type. The R, G and B synthetic light subjected to brightness modulation per pixel is scanned through the screen 200 at a high speed, thus the two-dimensional image is perceived as a result of an afterimage effect of eyes.

In the present embodiment, a screen surface of the screen 200 is curved at a predetermined curvature in a longitudinal direction (i.e., a long-side direction), and is formed into an arc shape formed by bending a rectangular shape toward a depth side seen from a synthetic light irradiation surface with supporting both short sides of the rectangular shape. Specifically, the surface of the screen 200 is curved at a curvature radius R such that the distances between the respective locations in the longitudinal direction of the screen 200 (i.e., the locations on the long side of the screen 200) and the rotation axis 130b of the movable mirror 130a are constant. In this case, a reference state is that the rotation axis 130b is parallel to the short-side direction of the screen 200.

As described above, since the screen 200 is curved in an arc shape around the rotation axis 130b of the movable mirror 130a, the beam diameter formed on the screen 200 by the convergent light is homogeneous in the longitudinal scanning direction.

It is preferable to define a positional relationship between the screen 200 and the scanning projector 100 such that the beam diameter is focused on the screen 200. This is because, the smaller the beam diameter, the greater the brightness and the lesser the interference between the neighboring pixels, thus it is expected that the images become clear.

The scanning projector system 10 according to the present embodiment has been described above. The scanning projector system 10 including the scanning projector 100 and the screen 200 as described above may be applied to an in-vehicle head-up display (HUD) as shown in FIG. 2, for example.

Figure 2:
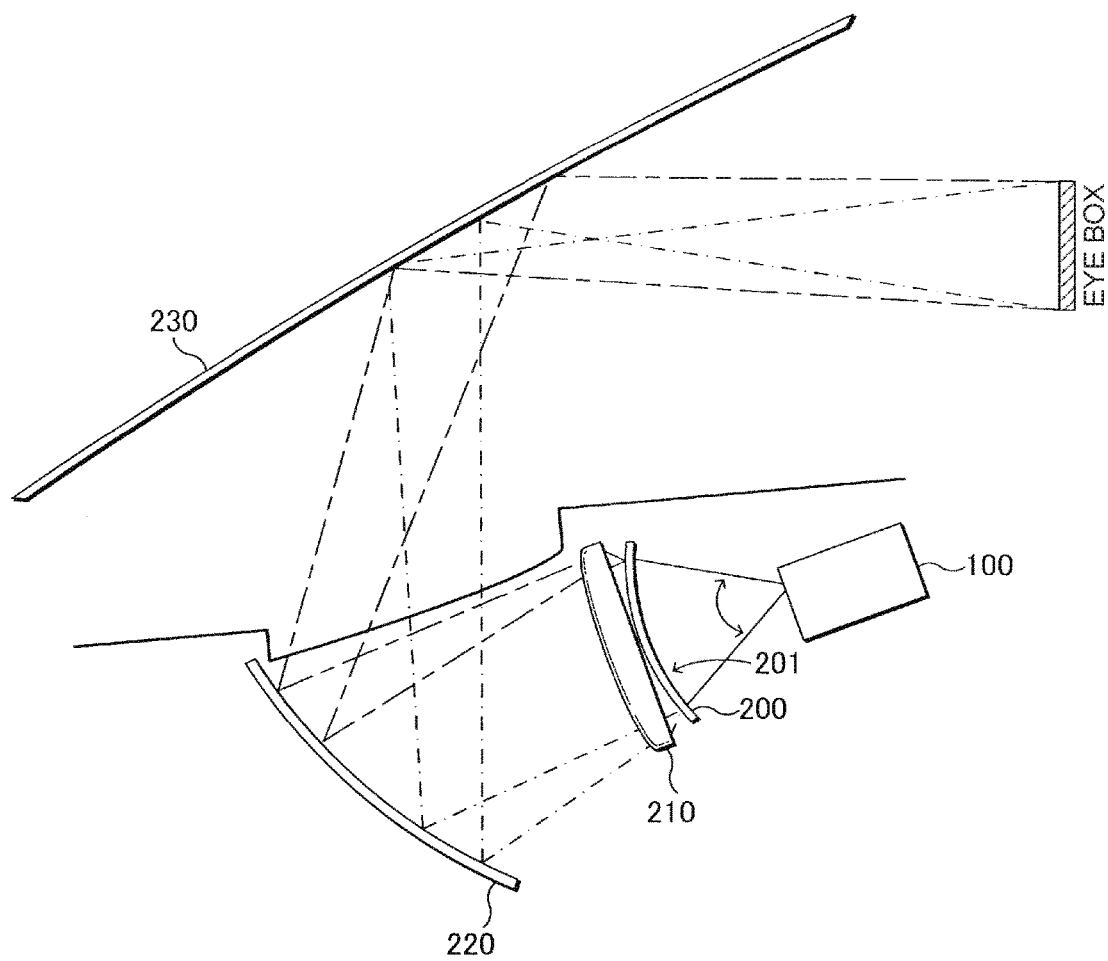
FIG. 2 illustrates when the scanning projector system according to the present embodiment is applied to an in-vehicle head-up display.

In the example shown in FIG. 2, the screen 200 is a transmissive screen made of a transparent or semi-transparent member, and is provided with a light diffusing mechanism such as a micro lens array formed on a synthetic light irradiation surface 201. This is to widen a viewing angle by widening a beam transmitting through the screen 200. The light diffusing mechanism may be composed of a light diffusing sheet. In general, for the head-up display, the long side of the screen corresponds to a horizontal direction; however, in the shown example, the long side corresponds to a vertical direction for descriptive purposes.

An image (i.e., an intermediate image) projected on the screen 200 by the scanning projector 100 is entered into a magnifying glass 220 via a field lens 210, and then is projected on a windshield 230 and recognized by driver's eyes located in an eye box. Here, the field lens 210 is used to change a direction of the beam emitted from the screen 200.

As described above, the screen 200 is curved in the arc shape, and has the beam diameter that is homogeneous, thereby providing the clear intermediate image projected on the screen 200. Consequently, the projected image with clear image quality can be viewed from the eye box.

Figure 3A:
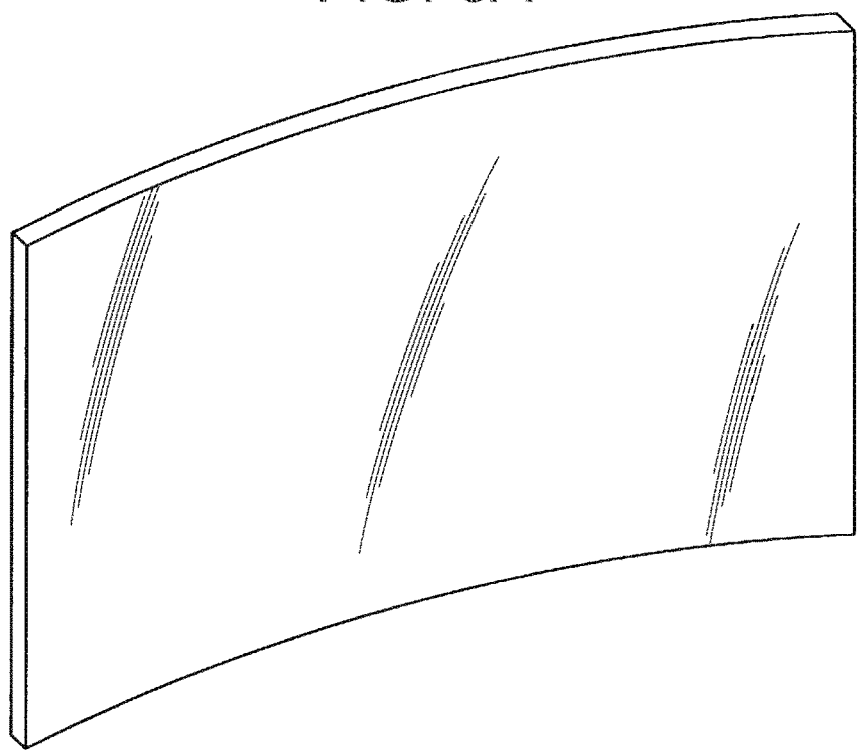
FIG. 3A shows a screen whose surface in a longitudinal direction is curved.
Figure 3B:
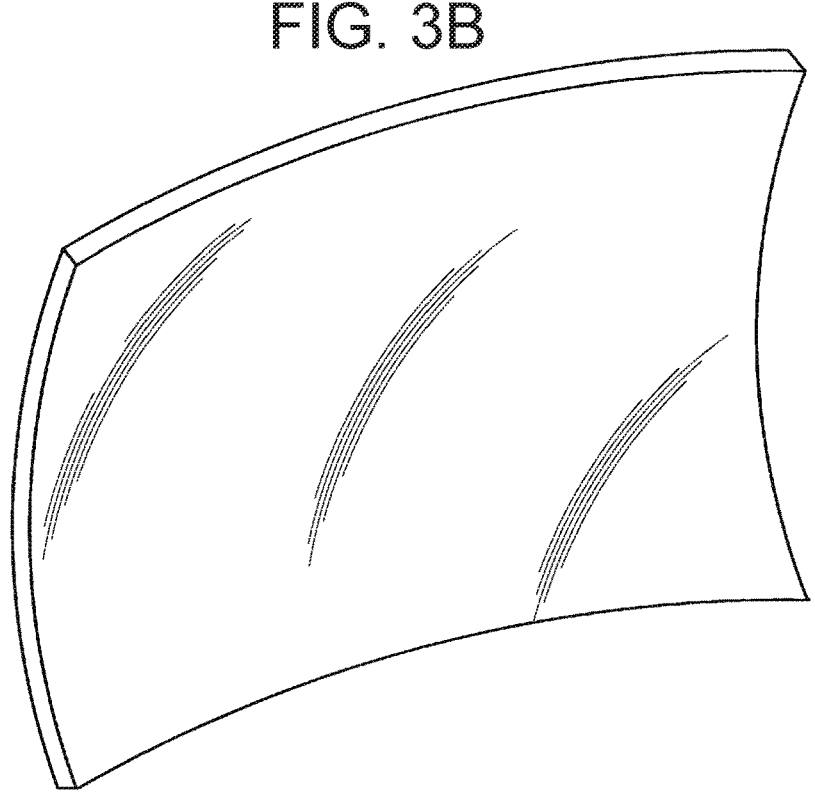
FIG. 3B shows a screen whose surface in a longitudinal direction and in a short-side direction is curved.
Figure 4:
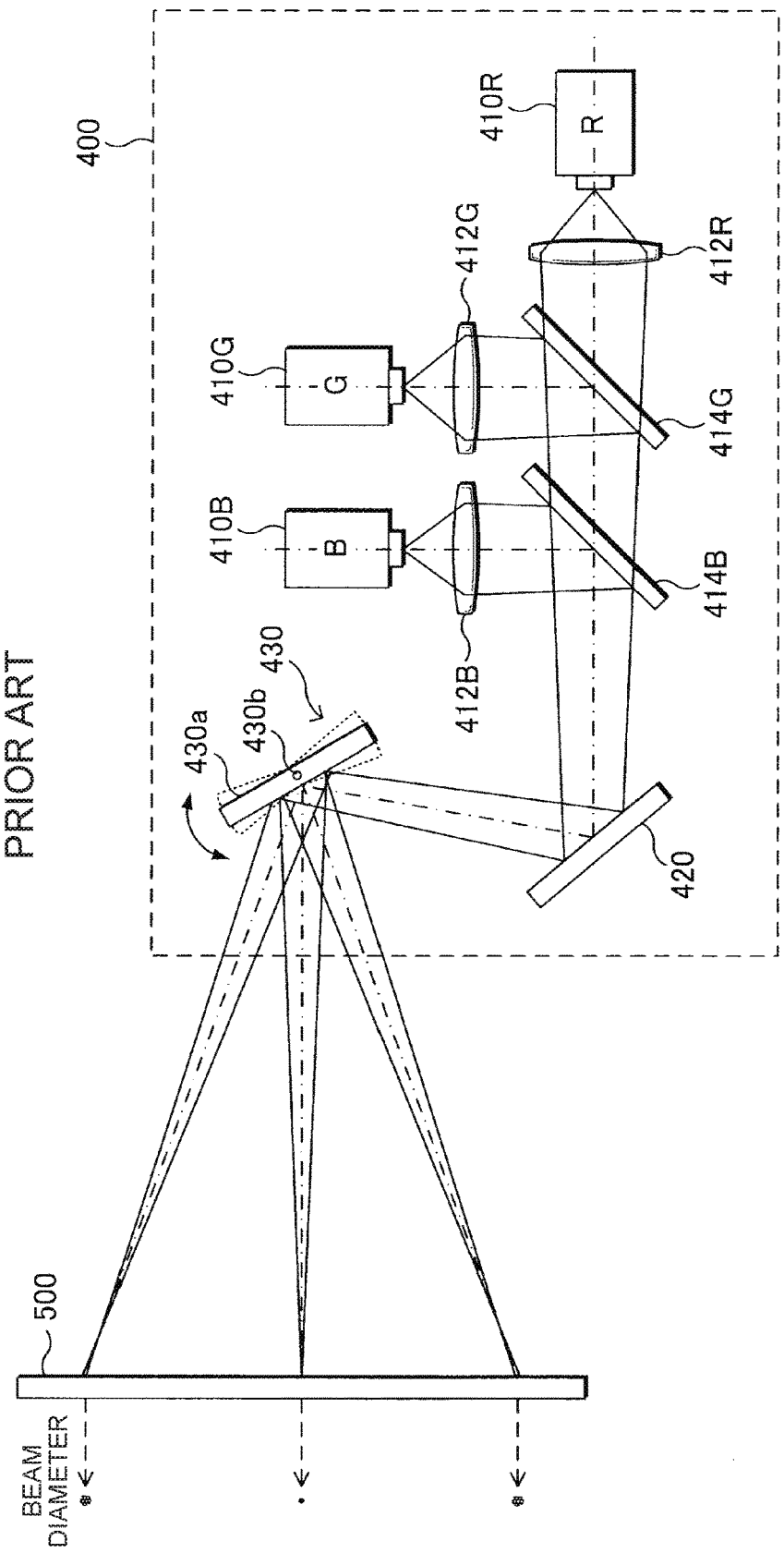
FIG. 4 is a schematic diagram showing a conventional scanning projector and screen.

The embodiments of the present invention have been described above. However, the present invention is not limited to these and can be modified in various ways within the scope of the present invention. For example, the above embodiment is focused on the longitudinal direction of the screen 200, and the surface is curved in the longitudinal direction as shown in FIG. 3A. However, the surface may be curved in the longitudinal direction and in the short-side direction as shown in FIG. 3B. In this case, the screen is formed in a shape formed by cutting out a part of a sphere.

Furthermore, the degree of the curvature of the screen does not need be exactly a part of a circumference of a circle, and the screen only needs to be curved toward the rotation axis 130*b* of the movable mirror 130*a*. For example, the degree of the curvature of the screen may be set such that the curvature is smaller toward an end thereof.

REFERENCE SIGNS LIST

10 SCANNING PROJECTOR SYSTEM
100 SCANNING PROJECTOR
110 LASER LIGHT SOURCE
112 COLLECTIVE LENS
114 DICHROIC MIRROR
120 MIRROR
130 TWO-DIMENSIONAL SCANNING ELEMENT
130*a* MOVABLE MIRROR
130*b* ROTATION AXIS
200 SCREEN
210 FIELD LENS
220 MAGNIFYING GLASS
230 WINDSHIELD

What is claimed is:
1. A scanning projector system comprising:
a scanning projector; and
a screen,
wherein, the scanning projector includes a high-speed two-dimensional scanning element which performs scanning of a convergent light in a horizontal direction and a vertical direction,
the screen is formed in a shape formed by cutting out a part of a sphere around a rotation axis of the scanning element, and the screen is positioned such that the rotation axis of the scanning element is at a center of the part of the sphere, and
the distance between the rotation axis and respective locations in the direction of the scanning is determined such that the convergent light is focused on the screen.

* * * * *